3,144,019
CARDIAC MONITORING DEVICE
Edgar Haber, 4890 Battery Lane, Bethesda, Md.
Filed Aug. 8, 1960, Ser. No. 48,311
18 Claims. (Cl. 128—2.06)

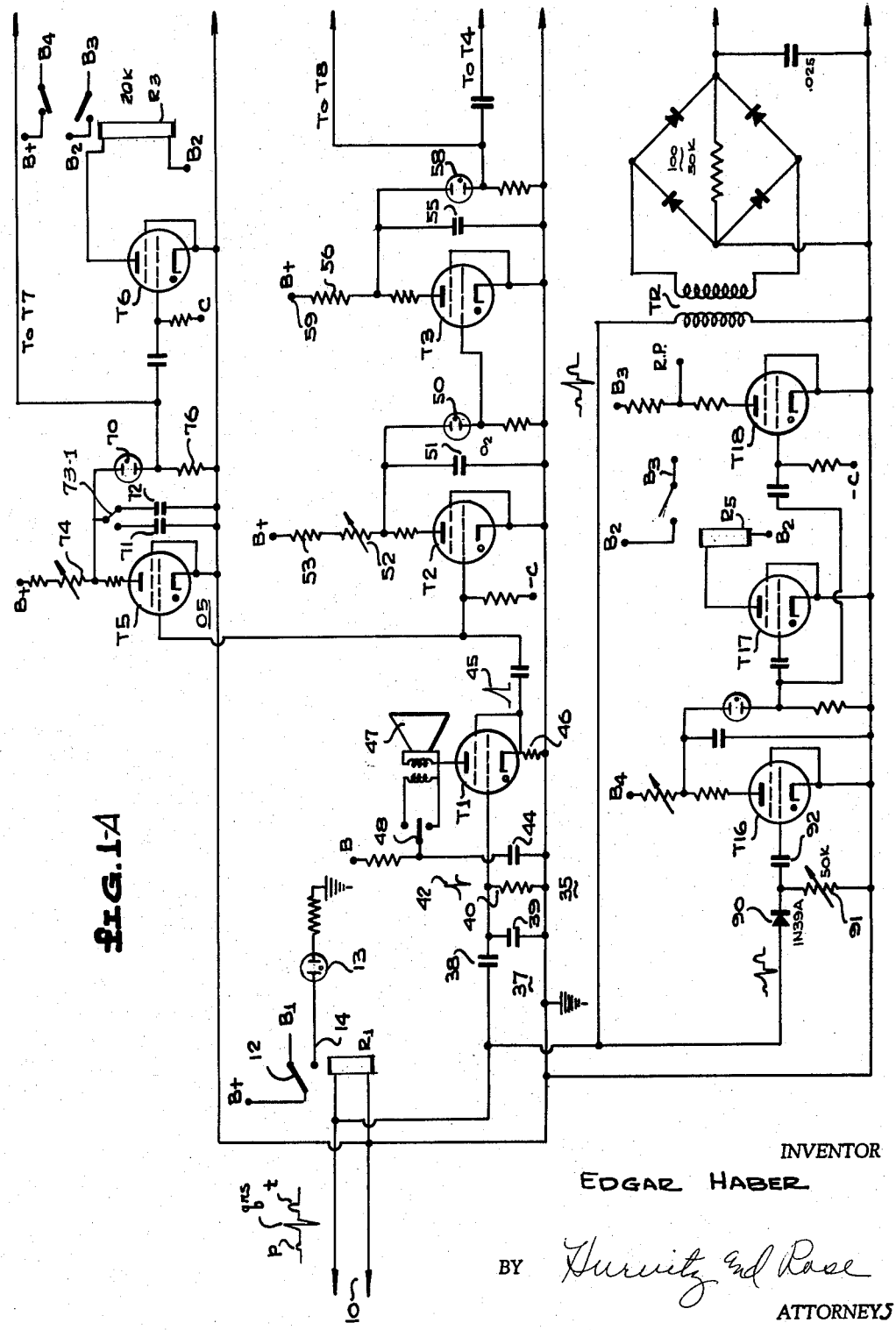
Fig. 1-A

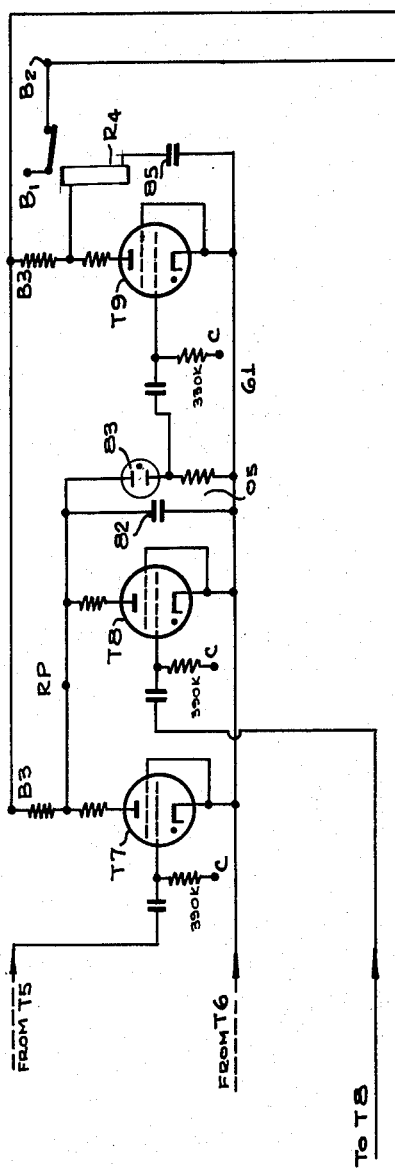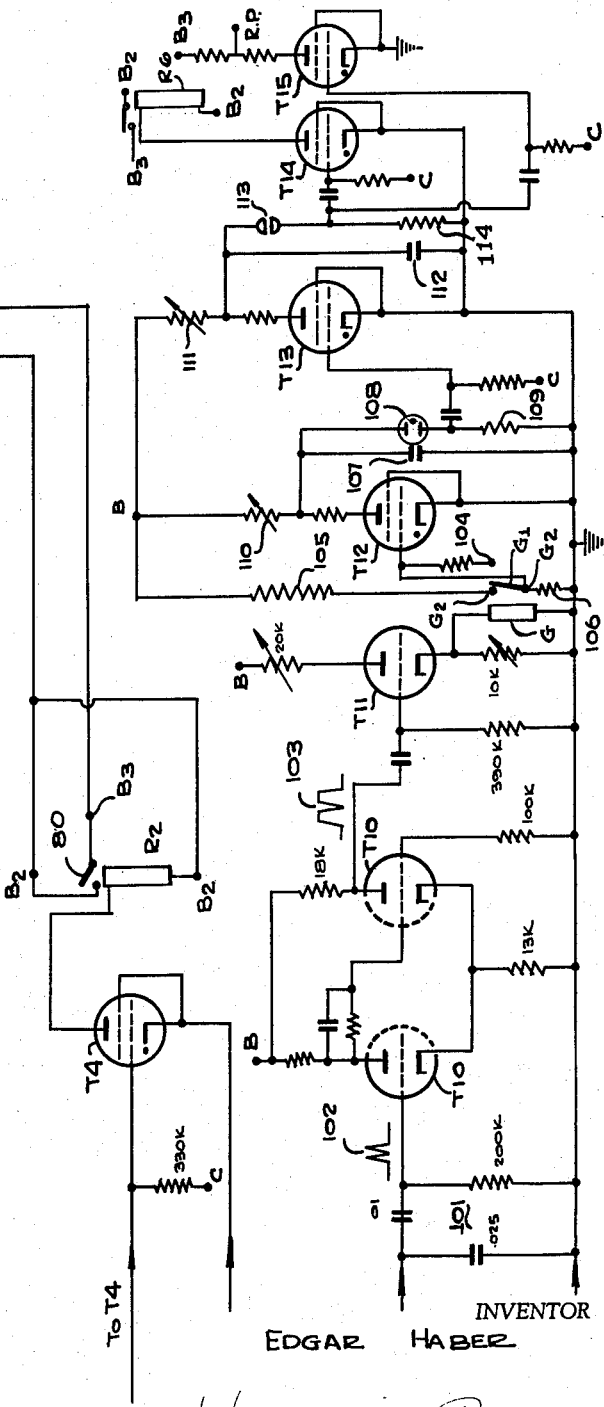

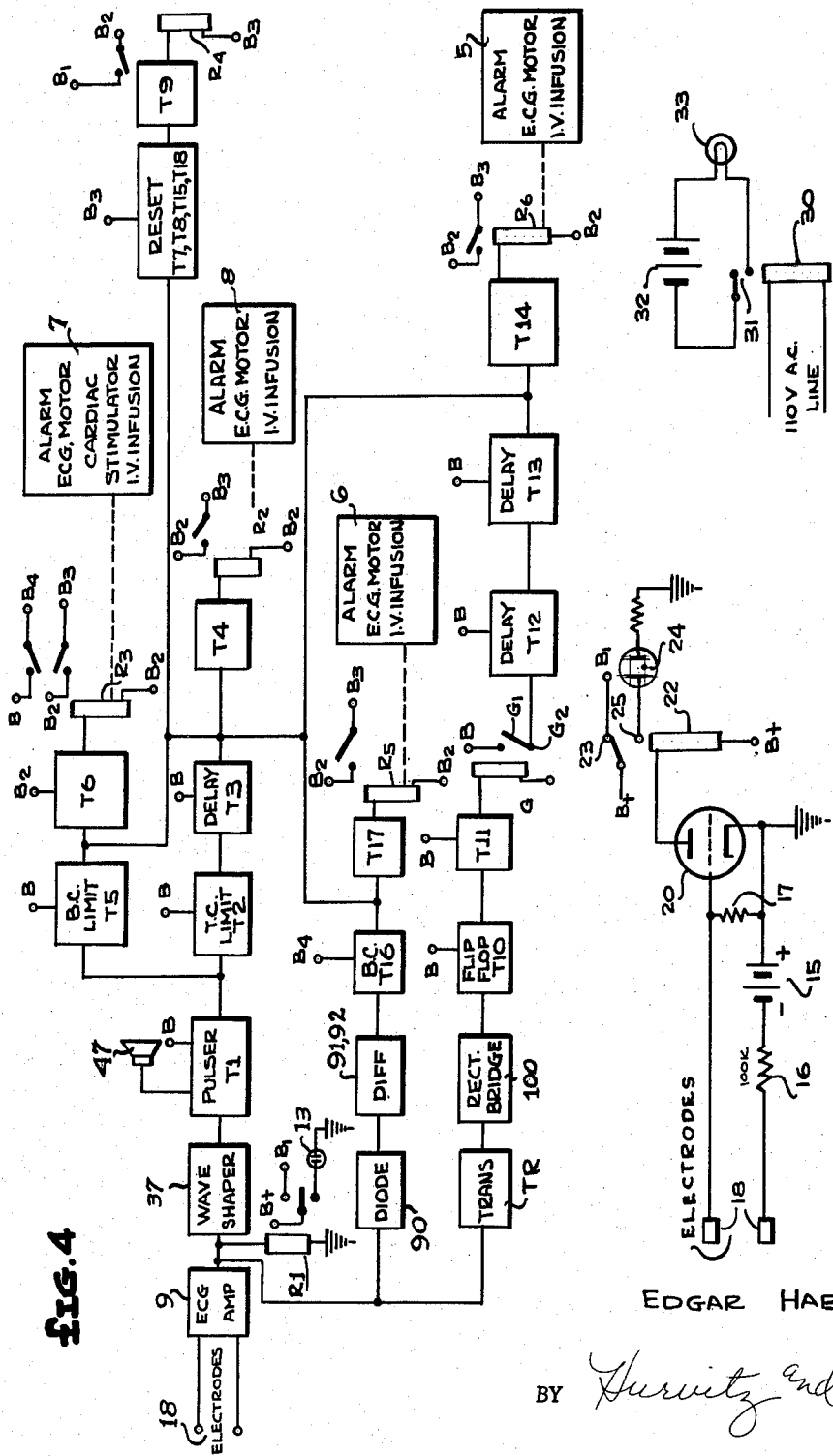

The present invention relates generally to cardiac monitoring systems and more particularly to systems for automatically monitoring a wide variety of cardiac arrhythmias or abnormalities and for automatically effecting electrocardiographic recording thereof and for initiating and terminating appropriate treatment in response thereto.

In recent years, with increased sophistication in the development of treatment for changes in cardiac ryhthm a serious limitation on effective therapy has been the determination of the precise instant of occurrence of a change in rhythm. In the alert, conscious patient many changes in rhythm are readily felt and can be reported immediately to attending nurses or physicians. However, even in this group of patients, certain subtle rhythm changes often occur which may not be apparent to the patient or to the attending physician or nurses upon simple examination, such as by palpation of the pulse or blood pressure determination. This type of rhythm change can only be detected by study of an electrocadiographic tracing. In addition, many patients are subject to arrhythmias yet are unable to report these to attending physicians or nurses either because of anesthesia, or because subject to such severe illness as to lead to semi-consciousness or unconsciousness. The instantaneous knowledge of the occurrence of arrhythmias is of particular importance in this group. A third group of patients may be generally alert and conscious but may become unconscious quite suddenly as the result of arrhythmias and not be able to warn a physician, while a fourth group has relatively frequent repetitive arrhythmias of such brief duration that documentation of their precise nature is impossible, since they usually cease prior to the time that a physician or other person with an electrocardiagraph machine can arrive at the scene.

Up to the present time, patients who were thought subject to sudden serious changes in cardiac rhythm or sudden stoppage of the heart were either observed intermittently by a nurse with occasional palpations of the pulse, had intermittent electrocardiograms taken, or were monitored by a physician observing a continuous electrocardiographic display on an oscilloscope screen. It is evident that none of these methods is entirely satisfactory. Any form of intermittent observation may fail to detect the sudden onset of a change in rhythm occurring between periods of observation and consequently delay appropriate treatment, and continuous observation occupies a skilled person whose services are better utilized elsewhere, for prolonged periods, and after several hours undoubtedly leads to observer fatigue and perhaps failure to note significant changes.

Prolonged observation is especially necessary during cardiac surgical procedures, which may last as long as eight to ten hours and during which arrhythmias may occur at any time, and during a normal two day recuperating period after such an operation, during which time an arrhythmia is a frequent source of death. The impracticality of having a physician observe the continuous electrocardiographic display for three days in each patient undergoing cardiac surgery is evident. The need for close observation of the various kinds of patients with cardiac abnormalities is well recognized by the medical profession and over the past five or ten years a number of devices has come into use quite routinely in operating rooms, such as the electrocardiograph oscilloscope for continuous visual observation, and alarm systems such as described by Zol (Zol, P.M., and others, "Treatment of Unexpected Cardiac Arrest by External Stimulation of the Heart," New England Journal of Medicine, 254:541–546, March 22, 1956). The Zol device sounds an audible signal with each heart beat, displays the electrocardiogram continuously on the oscilloscope screen, sounds an alarm in the event of cardiac arrest and, if desired, begins an electrical stimulator after a period of cardiac arrest. However, the limitations of these devices are that they still require the presence of an observer continuously, and that the alarm system will respond only to arrest of the heart, which may simply represent the end point of a long chain of unfavorable events, which has become irreversible. Quite frequently, prior to the occurrence of such fatal or terminal situations as cardiac arrest, other arrhythmias appear which are treatable if discovered sufficiently early in their course and which, if untreated, lead almost invariably to more serious consequences. Ziegler, R.F. in Bulletin of Johns-Hopkins Hospital 83:237–274, 1948, describes a number of arrhythmias which precede death during cardiac surgery.

The Stokes-Adams syndrome is a condition due to several causes, which is characterized by sudden paroxysmal bouts of either complete arrests of the heart or ventricular fibrillation associated with unconsciousness. A device sensitive only to arrests of the heart would fail to warn the physician of such an episode when it was associated with ventricular tachycardia or ventricular fibrillation.

It is well known that in the first few days following cardiac infarction or in digitalis intoxication, either abnormal ventricular or supra ventricular rhythms occur; that is, rhythms originating either in the ventricle or in the auricle of the heart may shortly precede fatal arrhythmias. In each of these situations, the prompt application of prophylactic measures and appropriate treatment may be life saving.

A number of rhythms are known, such as ventricular rhythms, that is, rhythms originating in the ventricle, but at normal rather than the usually elevated rates, which may lead to rapid circulatory collapse. These are not detectable by palpation or by any device which simply measures rate. Consequently, in order to satisfactorily monitor a patient's cardiac rhythm, a device is required which will sound an alarm during a change in rate either above or below a predetermined limit, thereby detecting simple tachycardias (increases in rate) simple bradycardias (decreases in rate) or complete cessation of all cardiac activity. In addition to its sensitivity to changes in rate, the device must also be able to interpret the configuration of the electrocardiographic complex so that arrhythmias which are characterized by little change in rate but by marked distortions of the wave form of the electrocardiograph can be detected and appropriate alarms sounded. If one is capable of monitoring rate and configuration of the wave form, one has sufficient data to warn of any significant change in rhythm, such as supra ventricular tachycardias, complete heart block with cardiac arrest, complete heart block with ventricular radicardia, partial heart block with a slower ventricular rate, ventricular tachycardias, or ventricular rhythms at relatively normal rates, as well as paroxysmal bundle branch block. Using these parameters, admittedly a change in rhythm from a regular to an irregular rhythm at the same rate cannot be detected. However, this is of little significance if no rate change is associated with it, since most changes from regular sinus rhythm to atrial fibrillation are (adrial fibrillation is a markedly irregular rhythm) associated with a marked increase in cardiac rate which would be detectable by the rate monitoring device. The very rare arrhythmias in which the disturbance occurs in the relationship between the rate of the electrical depolarization of the ventricle and the electrical depolarization of the atrium (between $qrs$ and $p$ waves) and which are not associated with marked rate changes, are probably sufficiently infrequent that the construction of special circuits to detect them would not warrent the cost.

In any device of this sort, a number of safeguards must be included so that alarms do not sound unnecessarily and so that malfunction of the device is evident immediately. Filter systems must be included which exclude artifact potentials, i.e., those deriving from the movement of electrodes relative to the skin or muscle, or potentials derived from the contraction of muscles in the neighborhood of the electrodes. Since these potentials are generally of considerably different frequency from cardiac potential, this problem can be overcome by appropriate circuitry. Similarly, warning must be obtained in the instance of the removal of the electrodes from the skin. This may be accomplished by the application of a very small continuous D.C. potential across the electrodes, most easily generated by employing electrodes of dissimilar metal. This small continuous D.C. potential is not impressed on, or is excluded from, the electrocardiographic amplifiers by a filter system, but if interruption occurs, as by removal of electrodes from the skin, may be used to actuate a relay leading to a warning device. In similar manner, removal of the wall plug to power line or failure of house power results in a warning signal.

A device such as described above has been experimentally used successfully in patients who are relatively ambulatory, i.e. may get in and out of bed and walk about their rooms and whose activities are only restricted by a long cable. For details of application of the invention to various kinds of patients, including several life saving situations, reference may be had to an article by the applicant, entitled "Automatic Detection and Recording of Cardiac Arrhythmias" published in The Journal of the American Medical Association, August 8, 1959.

Transient irregularities such as a single extra beat occur occasionally even in most normal individuals. They are not clinically significant. To prevent these transient irregularities for energizing an alarm, appropriate delay systems are included, so that abnormalities must persist for at least five or six seconds prior to the energizing of an alarm. It is useful to have an electrocardiographic tracing documenting the precise nature of the arrhythmia as it occurs. Accordingly, in addition to simple warning alarms, circuits for turning on electrocardiographic machines to produce brief tracings are included, and in those instances in which immediate automatic treatment of an arrhythmia is essential, either by the application of electric stimuli to the chest wall in instances of cardiac arrest or to the administration of a drug by intravenous routes, appropriate circuits may be included so that after an appropriate delay, upon the occurrence of a specific kind of arrhythmia, either a stimulator is started or drugs are administered by opening a valve to an intravenous fusion. When heart rate is controlled by external stimulation, there is, of course, little possibility for resumption of normal cardiac rhythm until the electrical stimulator is turned off. Consequently, in such situations, manual cessation of stimulation is necessary. However, in the instance of the administration of drugs, a circuit is included so that in the event of restoration of normal rhythm for a certain period of time administration of the drug ceases, to resume again only when the arrhythmia resumes. Similarly, such reset circuits are necessary for taking of multiple electrocardiographs during the occurrence of brief repetitive bouts of arrhythmias, whether they be of the same or different character. For examples of these instances, see the illustrative cases of the above identified paper.

It is, accordingly, a broad object of the present invention to provide a novel cardiac monitoring system.

It is another object of the invention to provide an economical system for detecting cardiac arrhythmias and variations in electrocardiac wave forms.

A further object of the present invention is to provide a cardiac monitoring system having safety features, i.e. in which removal of electrocardiac electrodes, failure of power, or the like events involving system malfunction provide an alarm.

A further object of the invention resides in the provision of a system for initiating feed of the record receiver of an electrocardiographic system, in response to any one of a plurality of cardiac malfunctions or arrhythmias.

Still another object of the invention is to provide a system for initiating appropriate prophylactic measures in response to diverse symptoms of cardiac malfunction.

It is another object of the invention to provide a system for monitoring simultaneously tachycardias, bradycardias, cardiac stoppage, and electrocardiographic configurations involving marked wave form distortion.

A further object of the present invention relates to novel electronic circuits for measuring pulse rates having greater than or less than predetermined values.

Still a further object of the invention is to provide a simple system for measuring and tripping an alarm in response to excess durations of certain elements of a cardiac wave form.

The above and still further objects, features and advantages of the present invention will become apparent upon consideration of the following detailed description of one specific embodiment thereof, especially when taken in conjunction with the accompanying drawings, wherein:

FIGURES 1A and 1B together are a schematic circuit diagram of a system according to the invention;

FIGURE 2 is a schematic circuit diagram of a system for providing an alarm in response to removal of an ECG electrode from the skin of a patient;

FIGURE 3 is a schematic circuit diagram of a line failure alarm; and

FIGURE 4 is a functional block diagram of the system of FIGURE 3.

Referring now specifically to the accompanying drawings, pulses to drive the monitoring circuit are taken at terminals 10 from a standard electrocardiographic amplifier (not shown), which has a rather long time constant, and which, in addition to the rapidly changing pulses of the electrocardiograph, also passes quite readily large excursions of or changes in the base line D.C. potential. The pulses provided at terminal 10 are applied to relay R1, which is a double-pole, single-throw relay, D.C. type, of 10,000 ohms impedance, and is connected directly across the output of the electrocardiograph (not shown). The delay time of the relay is such that the rapid transient electrocardiograph pulses do not trip it. However, if the D.C. or base line potential varies sufficiently the relay is tripped. Such variations in D.C. potential occur when an electrode is removed from the skin, when the input cable of the electrocardiographic amplifier is disconnected, or when the electrodes move sufficiently relative to the skin surface. Relay R1 includes normally closed contacts 12, which complete a B+ circuit. Upon tripping of this relay, the contacts 12 are opened and B+ supply to certain tubes T4, T6, T7, T8, T15, T18, T9, T14, T17, is interrupted, preventing such a disturbance from being interpreted by the other parts of the circuit as cardiac irregularity. At the same time, a warning light 13 is energized via normally open second contacts 14, closed by relay R1 in energized condition, to indicate this particular type of malfunction.

If the electrocardiograph amplifier 9 is not a D.C. amplifier, but one with a relatively short time constant, an alternate type of circuit can be used to detect the removal of electrodes from the skin or interruption of the electrode cable. This circuit is illustrated in FIGURE 2 of the accompanying drawings. In FIGURE 2, a very small potential, from a 1.5 volt dry cell 15 is applied through a large resistance 16, 17 to the skin of the patient across two electrodes 18. While the electrodes are both in contact with the skin, a negative bias voltage of about 1.5 volts is impressed on grid of the triode 20 causing it to be nonconductive. When either electrode is removed from the skin, the grid circuit is broken, the bias voltage is no longer applied to the grid of the triode 20, and the latter becomes conductive, passing energizing current through a 20,000 ohm relay 22, so that B+ voltage is interrupted at normally closed contacts 23, and a warning light 24 energized via normally open contacts 25, to indicate the difficulty.

In FIGURE 3 of the accompanying drawings there is illustrated a circuit for warning of removal of the power plug of the system from the usual line socket, or of failure of house current. In either case, a relay 30, normally energized by house current, closes normally open contacts 31 when it is de-energized, thereby completing a circuit between an internally contained battery 32, and a warning light 33, indicating this type of failure.

Signals directly issuing from the ECG (electrocardiograph) amplifier are led to the circuit 35 controlling thyratron T1. The usual ECG pulse representing the cardiac contraction contains an initial deflection of low amplitude called *p* wave, followed by a second larger deflection which is much more rapid, called the *qrs*, followed by a third moderately large but slow deflection known as the *t* wave. This complex wave form is passed through filter 37, consisting of series capacitor 38, shunt capacitor 39, and shunt resistor 40, so arranged that the *p* and *t* waves are removed or highly attenuated, the *qrs* is partially differentiated, and any artifact potential, such as muscle contraction potentials, which have a much higher frequency than the *qrs* are also removed, by virtue of the shunt capacitor 39, of .05 microfarad capacity to ground. The thus modified ECG potential 42 is impressed on the grid of thyratron T1. In response to each ECG pulse, the capacitor 44, in parallel with the anode, will discharge its previously accumulated charge through the thyratron, resulting in a uniform unidirectional spike potential 45, which is taken from the cathode of this tube, across a cathode load 46. The capacitor 44 may optionally discharge through a loud speaker 47, giving an audible signal with each cardiac contraction, selection between thyratron T1 and loud speaker 47 being accomplished by manual switch 48.

The primary purpose of thyratron T1 is to convert ECG pulses of variable sizes and durations into pulses 45 of uniform amplitudes and durations which, subsequent to this point in the circuit, are utilized to trigger rate monitoring circuits. Pulses 45, deriving from the cathode of thyratron T1 pass to thyratrons T2 and T5, in parallel, T2 being the initial point of tachycardia limiting circuit, i.e. for detection of rapid rates, and T5 the initial point of a bradycardia limiting circuit, i.e. for detection of slow rates. In shunt with T2, is provided an oscillator O2 comprising neon lamp 50. The neon lamp 50 is shunted by a .25 mf. capacitor 51 and is in series with variable resistance 52, leading to B+. These elements form an RC oscillator, O2, which oscillates at a frequency between 50 and 200 cycles per minute, depending on the value of variable resistance 52, whose resistance values vary between zero and 5.5 megohms. In series with variable resistance 52 is a fixed resistance 53, of 1.2 megohms, providing a total resistance variation between 1.2 and 7.7 megohms. If the frequency of pulses impressed on the grid of T2 exceeds the frequency of the oscillator O2 as set, the capacitor 51 discharges through T2 rather than through neon tube 50, and the latter never attains a sufficient voltage to fire. When the neon tube no longer fires, periodic pulses are no longer impressed upon the grid of thyratron tube T3, coupled thereto, and the .25 mf. capacitor 55 in shunt with the anode of T3 can no longer discharge through T3. After a certain time interval, i.e. the time necessary to charge the capacitor 55 associated with T3 which is dependent upon the capacitance of capacitor 55 as well as the magnitude of the resistor 56 connected between capacitor 55 and the B+ terminal 59, sufficient voltage builds up across capacitor 55 to discharge the neon cell 58, connected in shunt with capacitor 55. This requires about four (4) seconds. When neon cell 58 fires a voltage is transferred to thyratron T4, energizing a relay R2 which controls all the functions desired in the event of tachycardia or rapid rate above preset limits, i.e. an alarm, electrocardiograph and either the stopping or starting of intravenous infusions. In addition to these functions, one of the contacts of relay R2, when energized, allows plate potential to be applied to a reset circuit 61, so that the reset circuit 61 does not come into play until relay R2 (or a further relay hereinafter described) is energized. The lead supplying signal to the control grid of T2, similarly supplies signal to the control grid of a thyratron T5, of a bradycardia or slow rate control circuit. The neon tube oscillator, comprising neon tube 70 and shunting capacitors 71, 72, connected across the anode-cathode circuit of T5, has an inherent frequency which is slightly lower than the minimal heart rate frequency set into it. As long as the frequency of pulses impressed on the grid of T5 is greater than the inherent frequency of the neon oscillator associated with it, the capacitors (either the .5 mf. capacitor 71 or the 3.0 mf. capacitor 72) will discharge through neon tube 70, and thereby provide a visual indication. A selector switch 73.1 enables selection between the two capacitors 71 and 72, which allow for two ranges, lower limits of 14 to 160 or lower limits of one to thirty seconds of cardiac arrest. These two ranges are useful in different sorts of conditions. The upper range, in which the circuit will be activated by a pulse rate of less than 14 up to less than 160 p.p.s. depending on the setting of the 12 megohm variable resistor 74, is useful in the recording or detection of bradycardia or states of slow heart rate. The lower range in which the heart must stop between 1 and 30 seconds, again depending upon the setting of the 12 megohm variable resistor 74, is useful in Stokes-Adam attacks where one might wish to stimulate the heart electrically, and since many patients recover spontaneously after two or three seconds of cardiac arrests one may not want to stimulate them unnecessarily. A very long delayed period is thus desirable prior to the beginning of automatic stimulation.

In summary, then, if the frequency of the heart rate falls below the frequency of the neon oscillator O5, the selected capacitor 71 or 72 will discharge through the neon tube 70 rather than through the thyratron T5 tube. Voltage pulses will then be developed across resistance 76, in series with neon tube 70, potential will be impressed on thyratron T6, which will then energize relay R3. In general, it may be desirable to interpose between T2 and T5, T6, a delay circuit, so that brief runs of bradycardia do not unnecessarily trigger the relay R3. Such a delay circuit could be very similar to that illustrated in the circuit of T3. Relay R3 controls an alarm 7, initiation of feed of record receiver of an electrocardiograph, and a device for introducing intravenous infusions, either turning it on or off as a cardiac stimulator.

In addition to these functions, like relay R2, relay R3 controls anode current to a reset circuit, involving thyratrons T7, T8 and T9 and when it is triggered plate potential is applied to these thyratrons, so that they may function to reset, but not prior to the triggering of relay R3. In addition to this function, when relay R3 is triggered, plate potential is removed from the thyratrons T15 and T18 two bundle branch circuits, those measuring duration of the qrs, as well as the intrinsicoid inflection, a term synonymous with slope of the q wave, to be hereinafter described.

The reset circuit is the circuit by which, when a certain period of normal rhythm or rate has occurred after the advent of an arrhythmia, alarm systems and other functions, such as intravenous infusion, are shut off and the entire system reset so as that it is ready to respond to the occurrence of the next arrhythmia. Reset circuits for bradycardias, tachycardia and two parameters of bundle branch block control are contained in the same circuits and are essentially similar. The reset circuit includes thyratrons T7, T8 and T18, T15, T9 of which T7, T8, T18, T15 are parallel thyratrons, which can be replaced by a single thyratron. First, consider the tachycardia or rapid rate reset rate circuit. As noted above, with the occurrence of a rapid rate tachycardia, the neon tube oscillator circuit associated with T2 ceases to fire, because of more rapid discharges through T2 than the oscillator can sustain, and the oscillator and the delay circuit of T3 begin to oscillate whereas it has previously been quiescent, firing T4, which sets off the tachycardia alarm, etc. 8 and also closes switch 80, energizing T7, T8 and T9, which previously had no anode voltage. During the tachycardia or rapid rate period, the oscillator associated with T3 discharges periodically, discharging the 1.0 microfarad capacitor 82 in shunt with T8 before it has a chance to build up enough potential to discharge through neon tube 83. However as soon as the heart rate falls below the tachycardia setting, and the oscillator 50, 51 resumes firing preventing the oscillator about tube T3 from firing, no potentials are then delivered to the grid of T8. Potential is now allowed to accumulate on the capacitor 82 associated with T8, and after an appropriate delay period which for the specified circuit values is 10 seconds, neon tube 83 associated with T8 fires, impressing a pulse on the grid of T9, and causing a discharge through this tube from accumulated potential on 4.0 mf. capacitor 85. The capacitor 85 discharges through relay R4 and momentarily opens the contacts of relay R4, which are normally closed. When the relay R4 contacts open, potential is momentarily removed from the plate of T4, stopping discharge through this tube and returning it to its cut-off state, and thereby resetting relay R2 and shunting off the tachycardia controls as well as shutting off B+ potential from tubes T7, T8 and T9, so that the entire circuit is reset.

In the bradycardia circuit, similar events occur. When the frequency of pulses reaching T5 falls below the natural frequency of the oscillator associated with T5, the oscillator O5 discharges through the neon bulb, discharging T6, which energizes relay R3. B+ potential is then again applied to T7, T8 and T9. During the entire period of slow heart rate or bradycardia, the oscillator associated with T5 discharges periodically and consequently discharges the capacitor 82 associated with T8 through T7, which is in parallel with T8. However, as soon as the rate climbs above the natural frequency of O5, no discharges reach T7 and the capacitor 82 is allowed to accumulate potential, discharging through the neon tube 83 associated with it, which in turn discharges capacitor 85 through T9, which as previously described, interrupts B+ potential to T6, resetting the relay R3 and at the same time cutting off potential from T7, T8, and T9, so that the entire bradycardia circuit is then reset.

Reset circuits for bundle branch control parameters are similarly provided, with additional tubes T18, T15 in parallel to tubes T7 and T8, by a common connection to points RP.

The first of the two circuits sensitive to changes in wave form is a circuit sensitive to change in initial deflection, or the intrinsicoid deflection. The full electrocardiographic complex is passed through a germanium diode 90, which gates the complex so that only the positive part of the complex is allowed to pass through. The latter then enters a condenser-resistor filter, comprising variable shunt resistance 91 and series capacitor 92. By varying the resistance of the 50,000 ohm variable resistor 91 (intrinsicoid deflection control) one can vary the initial slope of the positive part of the complex which will be passed beyond this filter. This is set somewhat below the frequency of the patient's complex so that if there is an increase in the slope of the patient's complex, or in other words if its instantaneous frequency decreases, it will not pass the filter and will fail to be impressed on the grid of a thyratron T16. The time constant of this circuit is 5 seconds so that if no complexes appear for a five second period at the grid of this tube, a second thyratron tube T17 will be fired, actuating a relay R5 controlling whatever parameters are desired, for example ECG record receiver initiation, cardiac stimulator, intravenous infusion, alarm, or any one or more of these, as exemplified by block 6. It is evident that the complete absence of electrical activity would also set this part of the circuit off. Consequently, when the bradycardia control relay fires, that is, relay R3 (and in general use it would fire long prior to the five second interval necessary to fire the relay associated with the intrinsicoid deflection control), the B potential designated as B4 would be cut off from the tubes of this circuit preventing this circuit from falsely firing in the event of cardiac arrest.

Finally, the duration of the qrs complex is measured in the circuit associated with tubes T10, T11, T12, T13, T14 and T15. The full complex passes through the isolation transformer TR and into a full wave rectifier bridge 100 made up of four 39A diodes. A filter system 101 is connected in cascade with bridge 100, which eliminates the p and t waves, and the qrs complex now appears as two unipolar waves, 102, the positive and negative components now both being positive in response to action of bridge 100.

The unipolar waves 102 are impressed on a bi-stable multivibrator circuit including tube T10, utilizing both halves of a double triode. The operation of this device may be explained in the following manner. In its stable state, with no potential impressed on the grid of the left half of the double triode T10, the right half, by virtue of a constant positive potential from the plate of the left half impressed on the grid of the right half, conducts continuously. The grid of thyratron T10 (right) is positive because it is conductively connected to the anode of thyratron T10 (left). Thyratron T10 (right) therefore conducts, and its cathode resistance raises the potential of the cathode of thyratron T10 (left), the grid of which is grounded. When a pulse is impressed on the grid of the left half, it begins to conduct, rapidly reducing the potential on its plate and consequently the potential on the grid of the right half, causing the right half to cease conducting. However, as soon as the potential on the grid of the left half falls below a critical value it will cease conducting, and the right half begins to conduct again. Consequently, the irregularly shaped electrocardiographic complexes are converted to rectangular waves, 103. The amplitudes of the rectangular waves 103 are constant and dependent only on the constancy of the B+ supply. However, the duration of the rectangular waves 103 is related to the duration of the *qrs* complexes. The rectangular waves 103 are impressed, via a cathode follower circuit involving tube T11 on a galvanometer type relay G. The deflection of the relay G in association with T11 is dependent on the integral of the current flowing through it. The integral of current is dependent, since the amplitude of the pulses is constant, on their durations, which is precisely the same as the durations of the *qrs* complexes. As the durations of the complexes increase, a point will finally be reached when the galvanometer will be fully deflected and make contact at switch G1 associated with it. The amount of current necessary to trip the galvanometer relay is varied by a variable 10,000 ohm resistor 105 in parallel with it in the circuit associated with tube T11. By varying this resistor the duration of the *qrs* necessary to trip the relay is varied. The galvanometer relay trips a thyratron circuit delay T12, T13, and the latter a thyratron T14 with associated relay, R6, and a reset circuit similar to that shown in tubes 7, 8 and 9, but here involving T15, is also associated with it. It is of note that the response time of the galvanometer must be sufficiently rapid and the return sufficiently rapid so that increases in rate do not effect its tripping characteristics. The galvanometer must return to its zero position even with rates as high as 240 p.p.s., which is probably the maximum ever encountered with this device. If return is complete at high rates then galvanometer tripping is determined only by duration of the *qrs* complex and independent of rate. The contacts G2 of the *qrs* galvanometer G are connected one to a C bias source 104 and one to the junction of a voltage divider comprising resistances 105, 106 connected in series between a B voltage point and ground. The one contact is connected to the control grid of a thyratron T12, so that when the contacts close positive voltage is applied to the thyratron T12 and the latter fires.

Connected in parallel with T12 is a condenser 107 itself in parallel with a neon tube 108 and a resistance 109 in series. A high resistance 110 is in series with the anode of T12, and thus in series with condenser 107. The condenser 107 thus requires a short time (about 1 second) to charge to sufficiently high voltage to fire neon tube 108. If the voltage pulses applied to the grid of T12 are sufficiently rapid condenser 107 will always discharge through T12 before it attains firing voltage for 108. Therefore, if the galvanometer contacts G1, G2 close for each pulse neon cell 108 will not discharge but if such closure does not occur for a sufficient time, about 1 second, discharge will occur of neon cell 108. The critical rate may be adjusted by varying resistance 110.

If discharge of neon cell 108 does not occur no firing pulses will be applied to the grid of T13. The latter includes a very large resistance 111 in its anode circuit and a condenser 112 in parallel to its anode circuit. Across the latter is connected a neon cell 113 in series with a resistance 114. The resistance 111 in series with condenser 112 provides a time constant of about 5 seconds, so that if no discharge of T13 occurs for that interval neon cell 113 will discharge transferring a voltage pulse to the grids of thyratrons T14 and T15 in parallel. T14 operates a relay R6 that activates alarm etc. 5 while T15 is connected in parallel with T7 and T8 via point R.P. to operate the reset system.

In summary then, the present invention includes devices for measuring all important parameters of change in the electrocardiographic tracing, recording any change in this parameter as it occurs on the electrocardiographic strip actuating necessary alarms and other service devices, such as devices for initiating or terminating intravenous infusions, resetting itself when the arrhythmia has ceased, with various safety devices included to eliminate false action due to movement artifact, removal of electrodes, unplugging of the device, and so forth. It is of note that devices heretofore available in the art did not include most of these features and cardiac monitors described in the literature measure only fall of pulse rate below a certain level, and are not really useful in determining the occurrence of paroxysmal arrhythmias of other sorts.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. A system for monitoring cardiac action, comprising means for receiving a cardiac complex in the form of *p*, *qrs* and *t* electrical waves, means for half wave rectifying said cardiac complex, means for differentiating the half wave rectified cardiac complex to provide a signal representative of the slope of said cardiac complex, and means responsive to increase of said slope beyond a predetermined value for indicating such increase.

2. In a system for monitoring cardiac action, a source of electrical signals representing an electrocardiac complex and including repetitive *qrs* waves, means for detecting the time intervals between peaks of said *qrs* waves, and means responsive to only detected time intervals between said peaks of individual ones of said waves greater than a predetermined time interval for generating an indication, and means for pre-establishing said predetermined time interval.

3. A system for monitoring the rate of periodic cardiac pulses, comprising a first electrical discharge device, a capacitance connected in shunt to said electrical discharge device, a second electrical discharge device connected in shunt to said capacitance, means for rendering said second electrical discharge device conductive in response to each of said periodic cardiac pulses being monitored, a voltage source, a charging resistance, and means connecting said voltage source across said capacitance via said charging resistance, said first electrical discharge device having a predetermined breakdown voltage only slightly less than the voltage of said voltage source, the time constant of said charging resistance and said capacitance in combination being less than the time interval between adjacent ones of said pulses, whereby said first device is fired only if the rate of said cardiac pulses is lower than the time required for said condenser to attain a voltage in response to said voltage source which is greater than said predetermined breakdown voltage.

4. In a system for processing electrocardiographic signals having *p*, *qrs* and *t* components of random amplitudes, and also having high-frequency artifact potentials, common terminals for applying said signals and potentials, a filter in cascade with said terminals, said filter including a high frequency shunt element designed for removing said artifact potentials, said filter further including elements designed for removing said *p* and *t* components while transmitting modified *qrs* components, and means for generating a signal of constant amplitude and duration in response to each of said modified *qrs* components.

5. In a tachycardia monitoring system, means for generating periodic signals at a predetermined settable rate, means responsive to electrocardiographic pulses for disabling said first means only while said electrocardiographic pulses exceed said rate, a normally operative delay device for generating a control signal after a predetermined delay time following a disabling signal, and means for providing said disabling signal for disabling said delay device in response to said periodic signals, whereby said delay device provides said control signal only if said electrocardiographic pulses exceed said predetermined settable rate for a time period exceeding said delay time.

6. In a heart monitor, means for detecting normal and abnormal heart action, means responsive to said detecting means for operating a device for affecting heart function only after a predetermined time delay during which said detecting means detects abnormal heart action, and a reset circuit for disabling said device in response to said detecting means only after said detecting means has detected normal heart action for a predetermined time period following said abnormal heart action.

7. In a cardiac monitor, means for detecting arrhythmia, means for generating a signal in response to detection by said means of an arrhythmia extending only for at least a predetermined time period, and means for generating a further signal in response to failure of said first means to detect said arrhythmia only after at least a predetermined time interval.

8. A circuit for sensing intrinsicoid deflection in an electrocardiographic wave, comprising a source of said waves, a rectifier in cascade with said source, a filter in cascade with said rectifier, said filter being a high pass filter and including means for varying the pass band of said filter, arranged so that only said waves having greater than a predetermined slope of intrinsicoid deflection will pass said filter, and a delay circuit in cascade with said filter and responsive to waves passed thereby to provide a signal only after a predetermined period of such passage equal to greater than one second.

9. The combination according to claim 8 wherein is provided means responsive to said signal for initiating medically significant action.

10. In a system for detecting the duration of *qrs* complexes of electrocardiographic waves, a source of said waves, means for substantially eliminating from said waves the *p* and *t* components of said waves, means for converting the *qrs* components of said waves to unipolar form, means responsive to said *qrs* components in unipolar form for generating individual waves of constant amplitude and of durations related to the durations of said *qrs* complexes, means responsive to said waves of constant amplitudes for integrating said individual waves, and means responsive to the means for integrating for generating a signal only when each of a predetermined number of said integrals in succession exceeds a predetermined value of medical significance.

11. In a system for detecting the durations of the *qrs* components of electrocardiographic waves, means for generating only in response to each individual one of said components a voltage pulse proportional to the duration of said individual component, and means responsive to a predetermined number of said voltage pulses all of which exceed a pre-set value for providing a signal.

12. The combination according to claim 11 wherein is provided means responsive to said signal for initiating medically signficant action.

13. A system for monitoring cardiac action subject to abnormalities, comprising means for detecting when a *qrs* complex of abnormal frequency occurs, an indicator normally responsive to said means for detecting for providing an indication, and a delay system located intermediate said indicator and said means for detecting for disabling said indicator only pending persistence of said complex of abnormal frequency for a predetermined continuous time period, whereby only a sufficiently persistent *qrs* complex of abnormal frequency can actuate said indicator.

14. In a system for monitoring cardiac action, means responsive to the existence of irregularities in the frequency of a *qrs* complex for automatically initiating medical action, and means responsive only to cessation of said irregularities for at least a predetermined time period for terminating said medical action.

15. A system for monitoring cardiac action, comprising means for receiving a cardiac complex in the form of *p*, *qrs*, and *t* electrical waves, means for rectifying said cardiac complex, means for differentiating the half wave rectified cardiac complex to provide a signal respesentative of the slop of said cardiac complex, and means responsive only to increase of said slope beyond a predetermined value for indicating such increase.

16. In a heart monitoring system, means for generating periodic signals at a predetermined settable rate, means responsive to electrocardiographic pulses for disabling said first means only while said electrocadiographic pulses exceed said rate, a normally operative delay device for generating a control signal after a predetermined delay time following a disabling signal, and means for providing said disabling signal for disabling said delay device in response to said periodic signals, whereby said delay device provides said control signal only if said electrocardiographic pulses exceed said predetermined settable rate for a time period exceeding said delay time.

17. In combination, a source of transient pulses having a variable direct current voltage imposed thereon, a relay connected to said source, said relay being a delay relay having a delay time greater than the durations of said transient pulses and having an operating threshold at a predetermined value of said voltage, a pair of normally closed contacts, a B+ terminal connected to one of said contacts, and a source of supply voltage connected to the other of said contacts, said contacts being normally closed and being the contacts of said relay, wherein is provided circuitry responsive to cardiac irregularities for performing operative functions, said circuits including amplifier circuits energized from said B+ terminal, whereby said circuitry is inoperative on attainment by said relay of said operating threshold.

18. A system for monitoring rate of pulses, comprising a resistance capacitance oscillator settable to oscillate at a predetermined rate of oscillation, said oscillator including a capacitance, a first discharge device connected in parallel with said capacitance, and a charging resistance connected in series with said capacitance, said first discharge device being connected across said capacitance to discharge said capacitance only in response to attainment of a predetermined voltage across said capacitance, a second discharge device connected in shunt to said capacitance, and means for rendering said second discharge device conductive in response to each of said pulses, whereby when the rate of said periodic pulses exceeds said rate of oscillation said oscillator fails to oscillate, and wherein is provided a system in cascade with said resistance capacitance oscilator and responsive to the output of said resistance capacitance oscillator, said system including a further resistance capacitance oscillator, said further resistance capacitance oscillator including further capacitance and a further discharge device in shunt to said further capacitance for discharging said further capacitance in response to attainment of a predetermined voltage across said further capacitance, and means for discharging said further capacitance in response to each discharge of said first named capacitance, whereby said further resistance capacitance oscillator oscillates only while said first mentioned resistance capacitance oscillator is disabled, the time constant of said further resistance capacitance oscillator being selected to provide a delay time extending between two predetermined limiting values, and means for performing a function in response to operation of said further discharge device.

References Cited in the file of this patent

UNITED STATES PATENTS

| | | |
|---|---|---|
| 1,869,829 | Skellett | Aug. 2, 1932 |
| 2,352,875 | Williams | July 4, 1944 |
| 2,409,749 | Foulger | Oct. 22, 1946 |
| 2,419,682 | Guillemin | Apr. 29, 1947 |
| 2,481,858 | Mesh | Sept. 13, 1949 |
| 2,492,617 | Boland | Dec. 27, 1949 |
| 2,525,544 | Hall | Oct. 10, 1950 |
| 2,542,638 | Desch | Feb. 20, 1951 |
| 2,563,816 | Butman | Aug. 14, 1951 |

(Other references on following page)

UNITED STATES PATENTS

| | | |
|---|---|---|
| 2,590,393 | Few | Mar. 25, 1952 |
| 2,658,505 | Sheer | Nov. 10, 1953 |
| 2,660,165 | Miller | Nov. 24, 1953 |
| 2,699,465 | Hamilton | Jan. 11, 1955 |
| 2,714,380 | Freshman | Aug. 2, 1955 |
| 2,718,594 | White | Sept. 20, 1955 |
| 2,726,325 | Beers | Dec. 6, 1955 |
| 2,801,629 | Edmark | Aug. 6, 1957 |
| 2,821,188 | Pigeon | Jan. 28, 1958 |
| 2,826,693 | Resnik | Mar. 11, 1958 |
| 2,827,040 | Gilford | Mar. 18, 1958 |
| 2,848,992 | Pigeon | Aug. 26, 1958 |
| 2,865,365 | Newland | Dec. 23, 1958 |
| 2,875,750 | Boucke | Mar. 3, 1959 |
| 2,927,573 | Roepke | Mar. 8, 1960 |
| 2,942,189 | Shea | June 21, 1960 |
| 2,944,542 | Barnett | July 12, 1960 |
| 3,002,185 | Bases | Sept. 26, 1961 |
| 3,030,946 | Richards | Apr. 24, 1962 |

FOREIGN PATENTS

| | | |
|---|---|---|
| 734,905 | Germany | Apr. 30, 1943 |